US011350070B2

United States Patent
Brown et al.

(10) Patent No.: US 11,350,070 B2
(45) Date of Patent: May 31, 2022

(54) SYSTEMS, METHODS AND COMPUTER PROGRAMS FOR COLORIMETRIC MAPPING

(71) Applicants: Michael Scott Brown, Toronto (CA); Hakki Can Karaimer, Toronto (CA)

(72) Inventors: Michael Scott Brown, Toronto (CA); Hakki Can Karaimer, Toronto (CA)

( * ) Notice: Subject to any disclaimer, the term of this patent is extended or adjusted under 35 U.S.C. 154(b) by 207 days.

(21) Appl. No.: 16/429,695

(22) Filed: Jun. 3, 2019

(65) Prior Publication Data
US 2019/0373232 A1    Dec. 5, 2019

Related U.S. Application Data

(60) Provisional application No. 62/680,033, filed on Jun. 4, 2018, provisional application No. 62/694,577, filed on Jul. 6, 2018.

(51) Int. Cl.
*H04N 9/67*   (2006.01)
*H04N 5/235*   (2006.01)
(Continued)

(52) U.S. Cl.
CPC .............. *H04N 9/67* (2013.01); *G06T 7/0002* (2013.01); *G06T 7/80* (2017.01); *G06T 7/90* (2017.01);
(Continued)

(58) Field of Classification Search
CPC .......... H04N 9/67; H04N 9/735; H04N 9/646; H04N 9/0451; H04N 5/2354; H04N 9/77;
(Continued)

(56) References Cited

U.S. PATENT DOCUMENTS

| 8,913,827 | B1 * | 12/2014 | Fang | G06T 11/001 |
| | | | | 382/167 |
| 2004/0202365 | A1 * | 10/2004 | Spaulding | H04N 1/6077 |
| | | | | 382/162 |

(Continued)

OTHER PUBLICATIONS

J. J. McCann, S. P. McKee, and T. H. Taylor. Quantitative studies in retinex theory a comparison between theoretical predictions and observer responses to the "color mondrian" experiments. Vision Research, 16(5):445-458, 1976.

(Continued)

*Primary Examiner* — Michael Lee
(74) *Attorney, Agent, or Firm* — Bhole IP Law; Anil Bhole; Marc Lampert

(57) ABSTRACT

Computer-based systems, methods and computer program products for colorimetric mapping are provided. In one embodiment of the method, the method includes obtaining a digital reference image, including: illuminating a known reference source with an arbitrary illumination; and determining an observed illumination by receiving light signals from the reference source at an image sensor; determining a color-balance matrix by minimizing an error between colorimetric values of the digital reference image and color corrected pixel values; applying the color-balance matrix to the digital reference image to produce a color-corrected image; determining a color-space transformation matrix that transforms a color space of the image sensor to a perceptual color space; generating a transformed image by applying the color-space transformation matrix to the color corrected image; and outputting the transformed image.

18 Claims, 12 Drawing Sheets
(5 of 12 Drawing Sheet(s) Filed in Color)

(51) Int. Cl.

| | |
|---|---|
| *H04N 9/73* | (2006.01) |
| *H04N 9/64* | (2006.01) |
| *H04N 9/04* | (2006.01) |
| *H04N 9/77* | (2006.01) |
| *G06T 7/90* | (2017.01) |
| *G06T 7/00* | (2017.01) |
| *G06T 7/80* | (2017.01) |
| *H04N 17/00* | (2006.01) |

(52) U.S. Cl.
CPC ......... *H04N 5/2354* (2013.01); *H04N 9/0451* (2018.08); *H04N 9/646* (2013.01); *H04N 9/735* (2013.01); *H04N 9/77* (2013.01); *H04N 17/002* (2013.01); *G06T 2207/20081* (2013.01)

(58) Field of Classification Search
CPC .. H04N 17/002; H04N 9/045; H04N 9/04513; G06T 7/90; G06T 7/0002; G06T 7/80; G06T 2207/20081
USPC .......................................................... 348/187
See application file for complete search history.

(56) References Cited

U.S. PATENT DOCUMENTS

| | | | | |
|---|---|---|---|---|
| 2005/0018226 | A1* | 1/2005 | Chiba .................. | H04N 1/6033 358/1.9 |
| 2005/0046883 | A1* | 3/2005 | Chiba .................... | H04N 1/603 358/1.9 |
| 2006/0170942 | A1* | 8/2006 | Chiba .................. | H04N 1/6033 358/1.9 |
| 2008/0089580 | A1* | 4/2008 | Marcu .................... | H04N 1/603 382/162 |
| 2017/0048400 | A1* | 2/2017 | Berfanger .......... | H04N 1/00018 |
| 2019/0066338 | A1* | 2/2019 | Perlman ............. | G06K 19/0614 |
| 2020/0311939 | A1* | 10/2020 | Sota ...................... | G06T 7/0012 |

OTHER PUBLICATIONS

G. D. Finlayson, M. S. Drew, and B. V. Funt. Color constancy: enhancing von Kries adaption via sensor transformations. In Human Vision, Visual Processing and Digital Display IV, 1993.
S. Bianco, C. Cusano, and R. Schettini. Single and multiple illuminant estimation using convolutional neural networks. IEEE Transactions on Image Processing, 26(9):4347-4362, 2017.
S. W. Oh and S. J. Kim. Approaching the computational color constancy as a classification problem through deep learning. Pattern Recognition, 61:405-416, 2017.
A. Chakrabarti. Color constancy by learning to predict chromaticity from luminance. In NIPS. 2015.
J. T. Barron. Convolutional color constancy. In ICCV, 2015.
G. D. Finlayson, M. S. Drew, and B. V. Funt. Diagonal transforms suffice for color constancy. In ICCV, 1993.
G. D. Finlayson. Color in perspective. IEEE Transactions on Pattern Analysis and Machine Intelligence, 18(10):1034-1038, 1996.
K. Barnard, V. Cardei, and B. Funt. A comparison of computational color constancy algorithms. i: methodology and experiments with synthesized data. IEEE Transactions on Image Processing, 11(9):972-984, 2002.
R. Ramanath, W. E. Snyder, Y. Yoo, and M. S. Drew. Color image processing pipeline. IEEE Signal Processing Magazine, 22(1):34-43, 2005.
M. Diaz and P. Sturm. Radiometric calibration using photo collections. In ICCP, 2011.
J. T. Barron and Y.-T. Tsai. Fast Fourier color constancy. In CVPR, 2017.
S. J. Kim, H. T. Lin, Z. Lu, S. Susstrunk, S. Lin, and M. S. Brown. A new in-camera imaging model for color computer vision and its application. IEEE Transactions on Pattern Analysis and Machine Intelligence, 34(12):2289-2302, 2012.
Y. Xiong, K. Saenko, T. Darrell, and T. Zickler. From pixels to physics: Probabilistic color de-rendering. In CVPR, 2012.
G. D. Finlayson, M. Mackiewicz, and A. Hurlbert. Color correction using root-polynomial regression. IEEE Transactions on Image Processing, 24(5):1460-1470, 2015.
G. D. Finlayson, R. Zakizadeh, and A. Gijsenij. The reproduction angular error for evaluating the performance of illuminant estimation algorithms. IEEE Transactions on Pattern Analysis and Machine Intelligence, 39(7):1482-1488, 2017.
P. Bastani and B. Funt. Simplifying irradiance independent color calibration. In Color and Imaging Conference, 2014.
D. Cheng, B. Price, S. Cohen, and M. S. Brown. Effective learning-based illuminant estimation using simple features. In CVPR, 2015.
D. Cheng, D. K. Prasad, and M. S. Brown. Illuminant estimation for color constancy: why spatial-domain methods work and the role of the color distribution. Journal of Optical Society America A, 31(5):1049-1058, 2014.
P. E. Debevec and J. Malik. Recovering high dynamic range radiance maps from photographs. In SIGGRAPH, 1997.
H. Y. Chong, S. J. Gortler, and T. Zickler. The von Kries hypothesis and a basis for color constancy. In ICCV, 2007.
W. Shi, C. C. Loy, and X. Tang. Deep specialized network for illuminant estimation. In ECCV, 2016.
A. Chakrabarti, D. Scharstein, and T. Zickler. An empirical camera model for internet color vision. In BMVC, 2009.
G. D. Finlayson, M. M. Darrodi, and M. Mackiewicz. The alternating least squares technique for nonuniform intensity color correction. Color Research & Application, 40(3):232-242, 2015.
D. A. Forsyth. A novel algorithm for color constancy. International Journal of Computer Vision, 5(1):5-35, 1990.
A. Gijsenij, T. Gevers, and J. van de Weijer. Generalized gamut mapping using image derivative structures for color constancy. International Journal of Computer Vision, 86(2):127-139, 2010.
G. D. Finlayson, H. Gong, and R. B. Fisher. Color homography color correction. In Color and Imaging Conference, 2016.
G. Hong, M. R. Luo, and P. A. Rhodes. A study of digital camera colorimetric characterisation based on polynomial modelling. Color Research & Application, 26(1):76â€"84, 2001.
Y. Hu, B. Wang, and S. Lin. Fc 4: Fully convolutional color constancy with confidence-weighted pooling. In CVPR, 2017.
D. Cheng, B. Price, S. Cohen, and M. S. Brown. Beyond white: ground truth colors for color constancy correction. In ICCV, 2015.
J. van de Weijer, T. Gevers, and A. Gijsenij. Edge-based color constancy. IEEE Transactions on Image Processing, 16(9):2207-2214, 2007.
A. R. Robertson. Computation of correlated color temperature and distribution temperature. Journal of Optical Society America, 58(11):1528-1535, 1968.
S. Bianco, A. Bruna, F. Naccari, and R. Schettini. Color space transformations for digital photography exploiting information about the illuminant estimation process. Journal of Optical Society America A, 29(3):374-384, 2012.
H. C. Karaimer and M. S. Brown. A software platform for manipulating the camera imaging pipeline. In ECCV, 2016.
K. E. Spaulding, E. Giorgianni, and G. Woolfe. Reference input/output medium metric rgb color encodings (rimm/romm rgb) In Image Processing, Image Quality, Image Capture, Systems Conference, 2000.
J. Guild. The colorimetric properties of the spectrum. Philosophical Transactions of the Royal Society of London, 230:149-187, 1932.
R. M. Nguyen and M. S. Brown. Raw image reconstruction using a self-contained srgb-jpeg image with only 64 kb overhead. In CVPR, 2016.

* cited by examiner

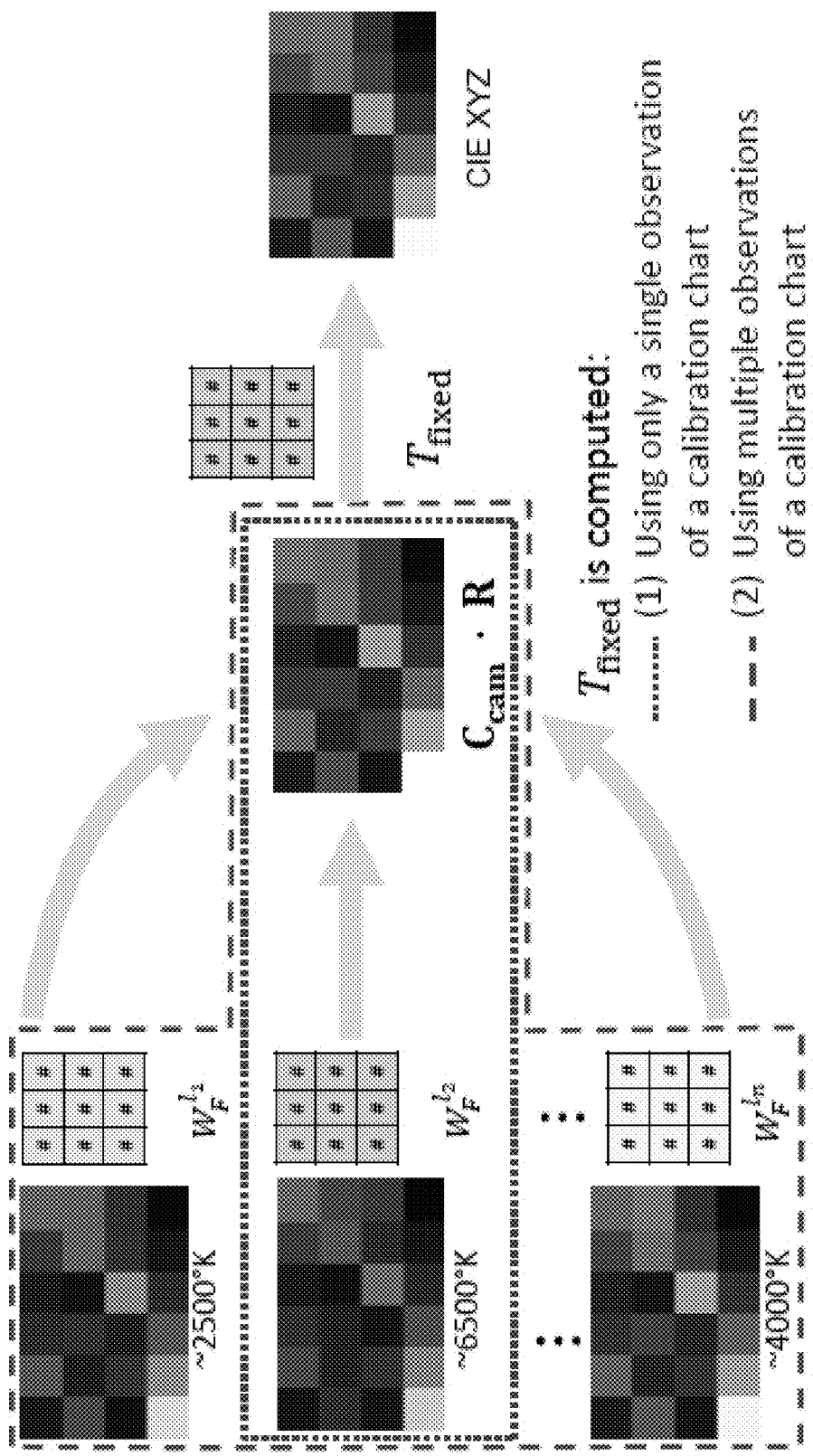

SYSTEMS, METHODS AND COMPUTER PROGRAMS FOR COLORIMETRIC MAPPING

TECHNICAL FIELD

The following relates generally to digital image processing and more specifically to computer-based systems, methods and computer program products for colorimetric mapping.

BACKGROUND

Digital cameras have a number of processing steps that convert the camera's raw RGB responses to standard RGB outputs. An important step in this processing chain is mapping from image sensor-specific color space to a perceptual color space; for example, based on CIE XYZ. Generally, conversion to the perceptual color space comprises: (1) a white-balance correction that attempts to remove the effects of scene illumination; and (2) a color space transform (CST) that maps the white-balanced raw color values to a perceptual color space. These combined steps allow the camera to act as a color reproduction, or colorimetric, device.

Some approaches to colorimetric mapping used on cameras involve pre-computing two CSTs that correspond to two fixed illuminations. Generally, the calibration needed to compute these CSTs is performed in the factory and the transform parameters are part of the camera's firmware. Generally, the illuminations that correspond to these calibrated CSTs are selected to be "far apart" in terms of correlated color temperature so that they represent sufficiently different illuminations. When an image is captured that is not one of the two illuminations, an image-specific CST is interpolated by linearly blending the two pre-calibrated CSTs. Generally, interpolated CSTs can result in lower overall perceptual color reproduction accuracy.

SUMMARY

In an aspect, there is provided a computer-implemented method for colorimetric mapping, the method comprising: obtaining a digital reference image, comprising: illuminating a known reference source with an arbitrary illumination; and determining an observed illumination by receiving light signals from the reference source at an image sensor; determining a color-balance matrix by minimizing an error between colorimetric values of the digital reference image and color corrected pixel values; applying the color-balance matrix to the digital reference image to produce a color-corrected image; determining a color-space transformation matrix that transforms a color space of the image sensor to a perceptual color space; generating a transformed image by applying the color-space transformation matrix to the color corrected image; and outputting the transformed image.

In a particular case, the method further comprising comparing the error between the colors represented by colorimetric values of the digital reference image and the color corrected pixel values to an error threshold, and where the error is above the error threshold, repeating determining the color-balance matrix.

In another case, the method further comprising using the color-space transformation matrix to generate a difference signal between a target perceptual color space representation and the color corrected image in the perceptual color space, and comparing the difference signal to a difference threshold, and where the difference signal is above the difference threshold, repeating determining the color-space transformation matrix.

In yet another case, the difference signal is determined based on color patches in the known reference source.

In yet another case, the known reference source is a Macbeth Color rendition chart.

In yet another case, the color-space transformation matrix comprises a diagonal matrix of the sensitivity of the image sensor and the observed illumination.

In yet another case, the sensitivity of the image sensor a is a matrix with rows representing Red, Green, and Blue channels and the rows representing a number of spectral samples in a visible range.

In yet another case, determining the color-balance matrix comprises using a trained Bayesian classifier, the Bayesian classifier trained using one or more training samples of color-space transformation matrices for given digital reference images under arbitrary illuminations.

In yet another case, the colorimetric values of the digital reference image comprises spectral responses of calibration chart patches and a diagonal matrix of the sensitivity of the image sensor, and the color corrected pixel values comprise a response of the image sensor to the arbitrary illumination.

In another aspect, there is provided a system for colorimetric mapping, the system comprising one or more processors and a data storage, the one or more processors configured to instruct image processing circuitry to: obtain a digital reference image, comprising: illuminating a known reference source with an arbitrary illumination; and determining an observed illumination by receiving light signals from the reference source at an image sensor; determine a color-balance matrix by minimizing an error between colorimetric values of the digital reference image and color corrected pixel values; apply the color-balance matrix to the digital reference image to produce a color-corrected image; determine a color-space transformation matrix that transforms a color space of the image sensor to a perceptual color space; generate a transformed image by applying the color-space transformation matrix to the color corrected image; and output the transformed image.

In a particular case of the system, the image processing circuitry further compares the error between the colors represented by colorimetric values of the digital reference image and the color corrected pixel values to an error threshold, and where the error is above the error threshold, repeats determining the color-balance matrix.

In another case, the image processing circuitry further uses the color-space transformation matrix to generate a difference signal between a target perceptual color space representation and the color corrected image in the perceptual color space, and compares the difference signal to a difference threshold, and where the difference signal is above the difference threshold, repeating determining the color-space transformation matrix.

In yet another case, the difference signal is determined based on color patches in the known reference source.

In yet another case, the known reference source is a Macbeth Color rendition chart.

In yet another case, the color-space transformation matrix comprises a diagonal matrix of the sensitivity of the image sensor and the observed illumination.

In yet another case, the sensitivity of the image sensor a is a matrix with rows representing Red, Green, and Blue channels and the rows representing a number of spectral samples in a visible range.

In yet another case, determining the color-balance matrix comprises using a trained Bayesian classifier, the Bayesian classifier trained using one or more training samples of color-space transformation matrices for given digital reference images under arbitrary illuminations.

In yet another case, the colorimetric values of the digital reference image comprises spectral responses of calibration chart patches and a diagonal matrix of the sensitivity of the image sensor, and the color corrected pixel values comprise a response of the image sensor to the arbitrary illumination.

In another aspect, there is provided a computer-implemented method for colorimetric mapping, the method comprising: obtaining a captured image from an image sensor; estimating scene illumination of the captured image; determining a correlated color temperature (CCT) for the estimated scene illumination; selecting two pre-calibrated CCTs that neighbour either side of the determined CCT; generating a color space transform (CST) using a weighting function, the weighting function comprising an interpolation of the two pre-calibrated CCTs; applying the CST to the captured image to generate a transformed image in perceptual color space; and outputting the transformed image.

In a particular case of the method, the weighting function comprises a first CST of a first of the two pre-calibrated CCTs multiplied by a blending weight added to a second CST of a second of the two pre-calibrated CCTs multiplied by one minus the blending weight.

These and other aspects are contemplated and described herein. It will be appreciated that the foregoing summary sets out representative aspects of systems and methods to assist skilled readers in understanding the following detailed description.

DESCRIPTION OF THE DRAWING

The patent or application file contains at least one drawing executed in color. Copies of this patent or patent application publication with color drawing(s) will be provided by the Office upon request and payment of the necessary fee.

The features of the invention will become more apparent in the following detailed description in which reference is made to the appended drawings wherein:

FIG. 7 is a diagramattic illustration of a method to determine a color balanced image using a fixed CST matrix;

DETAILED DESCRIPTION

Figure 1:
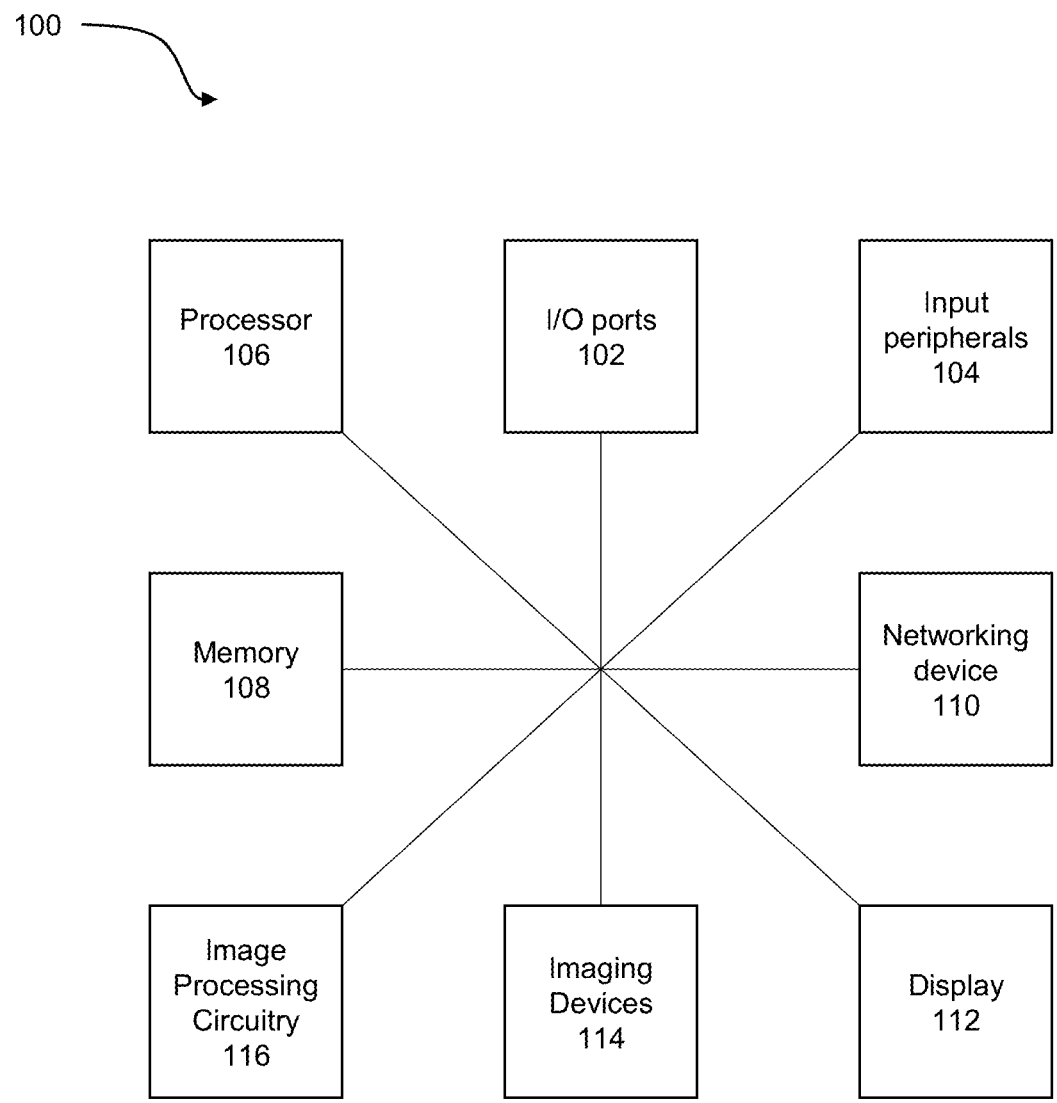
FIG. 1 is a block diagram illustrating an exemplary system for colorimetric mapping.

Embodiments will now be described with reference to the figures. For simplicity and clarity of illustration, where considered appropriate, reference numerals may be repeated among the Figures to indicate corresponding or analogous elements. In addition, numerous specific details are set forth in order to provide a thorough understanding of the embodiments described herein. However, it will be understood by those of ordinary skill in the art that the embodiments described herein may be practiced without these specific details. In other instances, well-known methods, procedures and components have not been described in detail so as not to obscure the embodiments described herein. Also, the description is not to be considered as limiting the scope of the embodiments described herein.

Various terms used throughout the present description may be read and understood as follows, unless the context indicates otherwise: "or" as used throughout is inclusive, as though written "and/or"; singular articles and pronouns as used throughout include their plural forms, and vice versa; similarly, gendered pronouns include their counterpart pronouns so that pronouns should not be understood as limiting anything described herein to use, implementation, performance, etc. by a single gender; "exemplary" should be understood as "illustrative" or "exemplifying" and not necessarily as "preferred" over other embodiments. Further definitions for terms may be set out herein; these may apply to prior and subsequent instances of those terms, as will be understood from a reading of the present description.

Any module, unit, component, server, computer, terminal, engine or device exemplified herein that executes instructions may include or otherwise have access to computer readable media such as storage media, computer storage media, or data storage devices (removable and/or non-removable) such as, for example, magnetic disks, optical disks, or tape. Computer storage media may include volatile and non-volatile, removable and non-removable media implemented in any method or technology for storage of information, such as computer readable instructions, data structures, program modules, or other data. Examples of computer storage media include RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by an application, module, or both. Any such computer storage media may be part of the device or accessible or connectable thereto. Further, unless the context clearly indicates otherwise, any processor or controller set out herein may be implemented as a singular processor or as a plurality of processors. The plurality of processors may be arrayed or distributed, and any processing function referred to herein may be carried out by one or by a plurality of processors, even though a single processor may be exemplified. Any method, application or module herein described may be implemented using computer readable/executable instructions that may be stored or otherwise held by such computer readable media and executed by the one or more processors.

The following relates generally to digital image processing and more specifically to computer-based systems, methods and computer program products for colorimetric mapping. The presently described system is configured to implement one or both of two methods to provide color reproduction on digital cameras. The first method comprises configuring the system with three or more pre-calibrated illuminations and interpolating an image-specific CST on the basis of the three or more pre-calibrated illuminations. The second method uses a single fixed CST to implement full color balance.

Referring first to FIG. 1, an exemplary system in accordance with the present disclosure is shown. As shown in FIG. 1, various functional blocks of the system may comprise hardware elements, software elements or a combination of both hardware and software elements. The illustrated system is an electronic device 100 comprising an imaging device 114 and corresponding image processing circuitry 116, comprising and/or functionally linked with a processor 106 and memory device 108. Ancillary components are also shown but may in some cases be excluded. In embodiments, the system may be provided as a post-processing extension to an electronic device 100, in which case the necessary components of the described embodiment will be included, and others excluded. In the presently illustrated embodiment, the electronic device 100 may include input/output (I/O) ports 102, input peripherals 104, one or more processors 106, memory device 108, networking device 110, and display 112. Implementations of the image processing circuitry 116 may be effected in hardware or software, as applicable.

The electronic device 100 may be any type of electronic device, such as a mobile phone, a desktop or a laptop computer, a digital media player, digital camera, or the like, that is capable of acquiring and processing image data, such as image data acquired using one or more image sensors. The electronic device 100 may be portable or non-portable, and may provide the processing of image data using one or more of image processing techniques, which may include but are not limited to preprocessing, demosaicing, removing the effect of illumination and color space transformation. In some embodiments, the imaging device 114 may be a digital camera configured to acquire image data, which may then be processed by the electronic device 100 using one or more of the above-mentioned image processing techniques. In further embodiments, the electronic device 100 may apply such image processing techniques to image data stored in a memory of the electronic device 100.

The image processing circuitry 116 may be configured to implement one or more of the image processing techniques discussed above when processing image data. As can be appreciated, image data processed by image processing circuitry 116 may be retrieved from the memory 108, or may be acquired using the imaging device 114.

It should be understood that the connection lines between each individual component shown in FIG. 1 may not necessarily represent directions or paths through which data is transmitted or flows between various components of the device 100. Indeed, the processor 106 may, in some embodiments, include multiple processors, such as a main processor (e.g., CPU), and dedicated graphics, video and/or image processors, one or more special-purpose micro-processors and/or application-specific micro-processors (ASICs), or a combination of such processing components. In such embodiments, the processing of image data may be primarily handled by these dedicated processors, thus effectively offloading such tasks from a main processor.

With regard to the illustrated components in FIG. 1, the I/O ports 102 may include ports configured to connect to various type of external devices, such as a power source, an audio output device, or other electronic devices (such as projectors, printers, external displays, modems etc.). In one embodiment, the I/O ports 102 may be configured to connect to an external imaging device, such as a digital camera, for the acquisition of image data that may be processed using the image processing circuitry 116. The input peripherals 104 may provide user feedback or input to the processor 106.

The instructions or data to be processed by the processor 106 may be stored in a computer-readable medium, such as a memory device 108. The memory device 18 may be provided as a non-volatile memory, such as read-only memory (ROM), or a volatile memory, such as random access memory (RAM), or as a combination of one or more RAM and ROM devices. The memory 108 may store a variety of information and may be used for various purposes. In addition, the memory device 108 may further include a non-volatile storage for persistent storage of data and/or instructions. The non-volatile storage may include a hard drive, flash memory, or any other optical, magnetic or solid-state storage media, or some combination thereof.

The electronic device 100 may also include or be linked to a network device 110, which may be a network controller that may provide for network connectivity over a wireless 802.11 standard or any other suitable networking standard, such as a local area network (LAN) or a wide area network (WAN).

The display 112 may be used to display various images generated by device 100, such as an image data processed by the image processing circuitry 116 or a GUI for an operating system. The display 112 may be any suitable type of display, such as a plasma display, liquid crystal display (LCD), or an organic light emitting diode (OLED) display.

The imaging device 114 may be provided as a digital camera configured to acquire both still and moving images. The camera 114 may include a lens and one or more image sensors configured to capture and convert light into electrical signals. The image sensor may include a CMOS image sensor or a charge-coupled device CCD sensor.

The image processing circuitry 116 may provide for various image processing steps, such as preprocessing, demosaicing, removing the effect of illumination and color space transformation. In some embodiments, the image processing circuitry 116 may include various subcomponents or discrete units of logic that collectively form an image processing pipeline for performing each of the various image processing steps.

Figure 2:
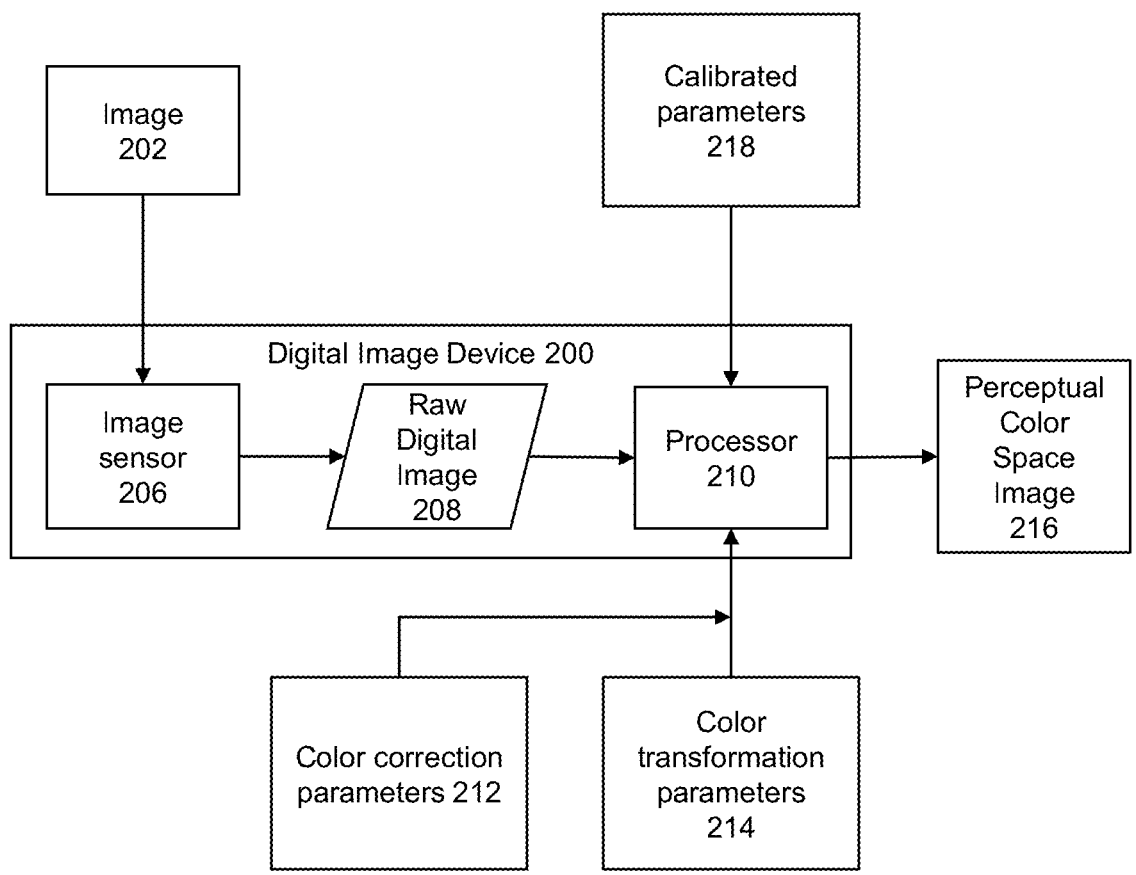
FIG. 2 is a block diagram illustrating an example of a digital image device that produces a perceptual color space image.

FIG. 2 is a block diagram illustrating an example of a digital image device 200 that produces a perceptual color space image 216. As discussed above, digital image device 200 is often configured to produce a perceptual color space image 216 based on a captured image in order that the perceived image produced by display devices such as displays, monitors, and printers appears to the human user to be similar to the original scene 202 being captured by the image sensor 206. The scene 202 is generally a real-world physical scene or a simulation thereof.

The image sensor 206 produces a raw digital image 208 representing the scene 202 in a sensor-specific color space. Light signals 204 received from the scene 202 are focused by a lens onto the image sensor 206 which converts the light signals 204 into a plurality of pixels each having a particular color and intensity. A processor 210 evaluates and manipulates the data of the raw digital image 208 to produce a perceptual color space image 216 representing the scene 202. The perceptual color space image 216 is within a standard perceptual color space and is intended to closely replicate the scene 202 in terms of color and intensity.

The image processing circuitry transforms the image from the sensor-specific color space to perceptual color space. In one embodiment, the image processing circuitry obtains calibrated parameters 218 to perform the transformation by interpolating an image-specific CST from three or more pre-calibrated illuminations. In this embodiment, the three or more pre-calibrated illuminations correspond with pre-calibrated CSTs that are stored in the memory and accessible to the image processing circuitry. The image processing circuitry comprises the necessary logic to generate an image-specific CST by apply a weighting to the pre-calibrated CSTs and generate the perceptual color space image by applying the image-specific CST to the image.

In another embodiment, the image processing circuitry performs the transformation using full color balance by applying a fixed color-space transformation matrix to remove the effect of illumination. In this embodiment, color correction parameters 212 determine the full color-balance correction matrix and color transformation parameters 214 determine the fixed color-space transformation matrix. As discussed below, the color correction parameters 212 and the color transformation 214 are determined during a sensor optimization procedure.

Figure 3:
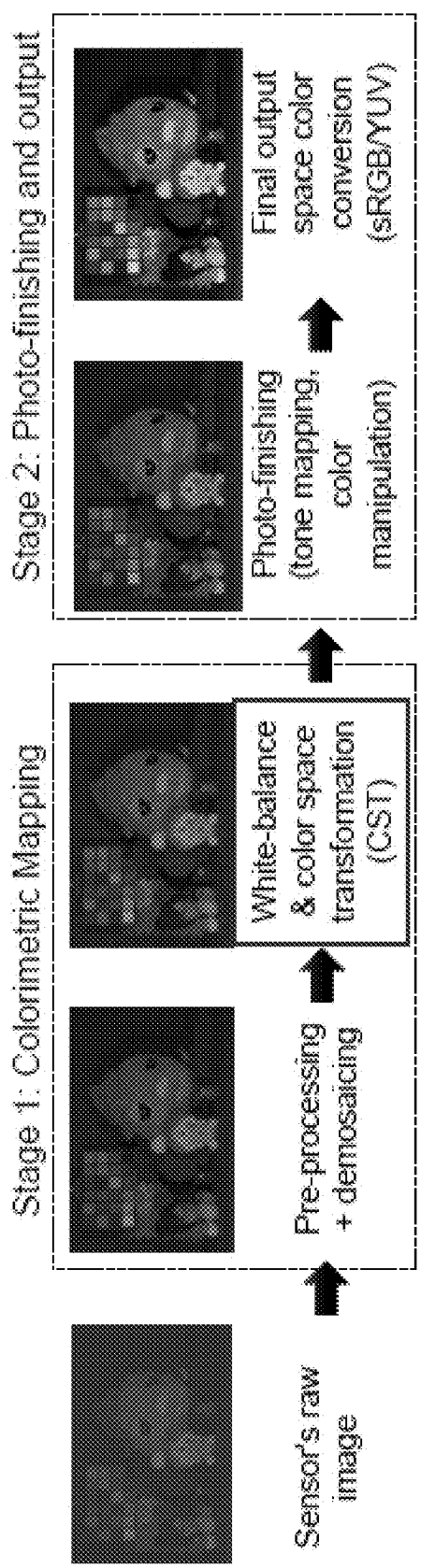
FIG. 3 is a block diagram illustrating a typical in-camera image processing pipeline.

Referring now to FIG. 3, a block diagram of a typical in-camera image processing pipeline is shown. At a high level, the pipeline can be categorized into two stages: (1) a colorimetric mapping/conversion; and (2) photo-finishing manipulation and output. The first stage converts sensor-specific (camera-specific) color space (typically raw RGB) values to a perceptual color space (preferably CIE XYZ). Within the first stage is typically a pre-processing component, which may further comprise demosaicing, and a white-balance and CST component, which produces the image in the perceptual color space. The second stage may comprise a photo-finishing component, which may further comprise tone and color manipulation that modify the image's appearance for aesthetic purposes, and an output component which produces a digital image. The image processing circuitry is configured to implement techniques within the white-balance and CST component to provide a color balanced output image.

White balance (WB) is motivated by a more complex procedure, color constancy, that aims to make imaged colors invariant to a scene's illumination. Computational color constancy is performed on cameras in order to mimic the human visual system's ability to perceive objects as the same color under different illuminations. Computational color constancy in most applications is a two-step procedure: (1) estimate the scene illumination in the camera's sensor color space; (2) apply a transform to remove the illumination's color cast. The transform is generally represented by a 3×3 diagonal correction matrix, $W_D$, that can be computed directly from the observed illumination as:

$$W_D = \text{diag}(C_{cam}I)^{-1}, \quad (4)$$

where $C_{cam}$ represents a camera's spectral sensitivity as a 3×N matrix, where N is the number of spectral samples in the visible range (400 nm to 700 nm) and the rows of the matrix $C_{cam} = [c_R; c_G; c_B]^T$ correspond to the spectral sensitivities of the camera's R, G, and B channels, and I is the observed scene illumination. The subscript D denotes that $W_D$ is restricted to a diagonal 3×3 matrix.

Various techniques are known for improving the performance of the correction matrix, and can be applied to the present methods. The output from applying the correction matrix is a white balanced image.

Following the two-step WB, a CST is applied to map the white balanced image to a perceptual color space. Other approaches in the CST aspect generally require direct mapping from the sensor-specific color space to the perceptual color space, typically utilizing a color rendition chart imaged under the scene's illumination; thus, they dispense with the WB aspect altogether. These approaches are not easily integrated into the in-camera image processing pipeline.

Figures 4A, 4B, 4C:
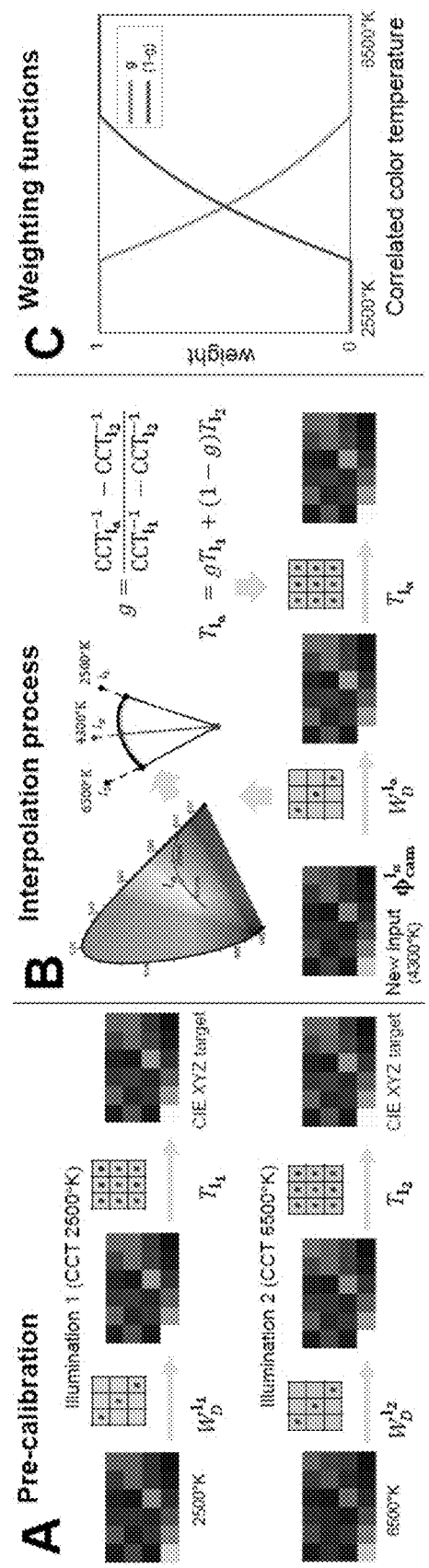
FIGS. 4A, 4B and 4C are a diagramattic illustration of a method to interpolate a CST based on two factory pre-calibrated illuminations.

On the other hand, the current approach used in most cameras is to first perform WB and then to interpolate the CST based on two factory pre-calibrated illuminations. FIGS. 4A, 4B, and 4C diagrammatically illustrate the typical procedure. Two pre-calibrated illuminations are generally selected for the camera. The two pre-calibrated illuminations are selected such that their correlated color temperatures (CCT) are sufficiently far apart. For each illumination, the correction matrices are either known or computed, and the illumination-specific CSTs are estimated as shown in FIG. 4A.

When an image is captured, its estimated illumination value is used to compute the correlated color temperature of the illumination. As shown in FIG. 4B, based on the correlated color temperature, the two pre-computed CSTs are interpolated to obtain the final CST to be applied as follows:

$$T_I = gT_{I_1} + (1-g)T_{I_2}, \quad (7)$$

where $$g = \frac{CCT_I^{-1} - CCT_{I_2}^{-1}}{CCT_{I_1}^{-1} - CCT_{I_2}^{-1}}. \quad (8)$$

The factory pre-calibrated CCTs for $I_1$ and $I_2$ for most cameras are selected to be 2500° K and 6500° K. Example interpolation weights of g and 1−g are shown in FIG. 4C, where the horizontal axis is the CCT of the image's estimated illumination.

However, in an embodiment, the present system and method incorporate at least one additional calibrated illumination into the interpolation process; that is, at least three pre-calibrated CCTs are provided. In the described embodiment, a single interpolation control point is added with a CCT at approximately 5000° K in addition to those at 2500° K and 6500° K. However, it will be appreciated how the present system and method can be extended to apply further interpolation control points, where camera firmware and memory can accommodate it.

For each illumination point, the memory has stored thereon the illumination point temperature, the corresponding correction matrix and a pre-computed CST. Additionally, the memory has stored thereon weight curves to be applied to the weighting function.

Figure 5:
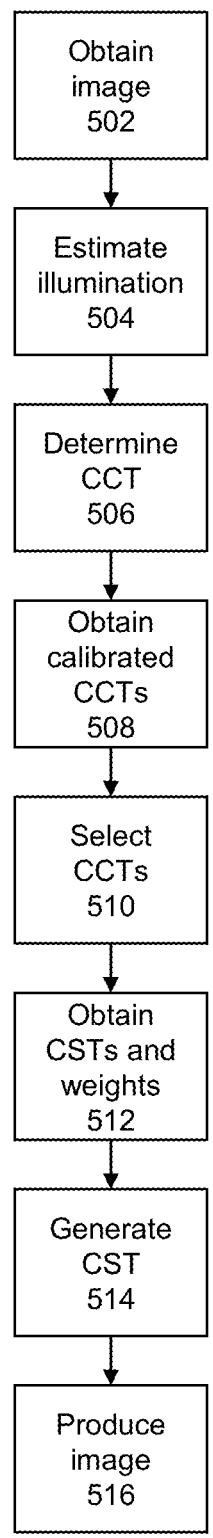
FIG. 5 is a flowchart illustrating a method to interpolate a CST based on three or more factory pre-calibrated illuminations.
Figures 6A, 6B, 6C:
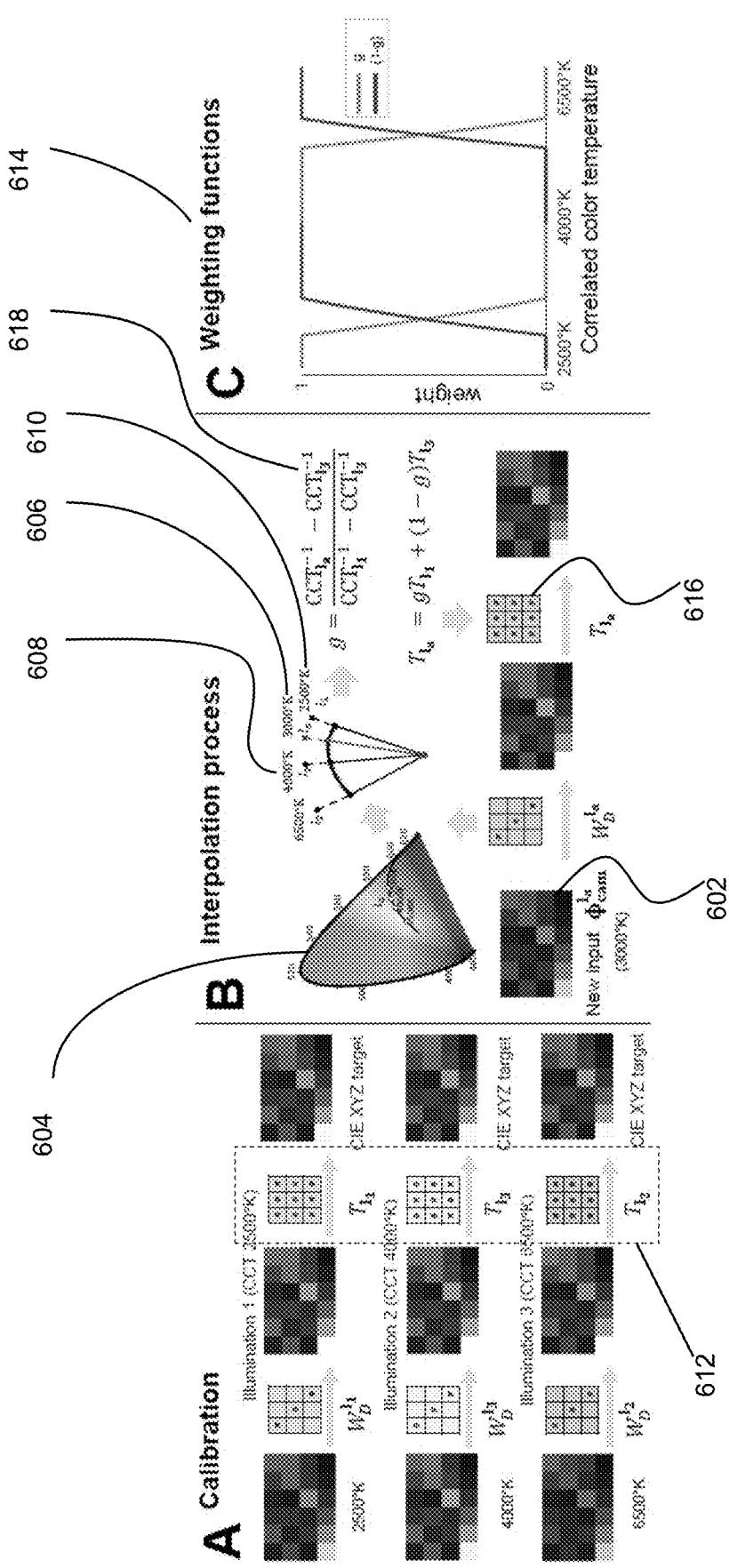
FIGS. 6A, 6B, and 6C are a diagramattic illustration of a method to interpolate a CST based on three or more factory pre-calibrated illuminations.

Referring now to FIGS. 5, 6A, 6B, and 6C, a flowchart 500 illustrating the present embodiment is shown in FIG. 5 along with a diagrammatic illustration of an embodiment of the method shown in FIGS. 6A, 6B, and 6C. At block 502, a new image 602 is obtained by the device. At block 504, the digital processing circuitry estimates the scene illumination 604. As described herein, this can be accomplished through existing or newly proposed techniques. Such techniques may include statistical methods, gamut-based methods, and machine learning methods.

At block 506, the digital processing circuitry determines the CCT 606 for the estimated illumination. At block 508, the digital processing circuitry obtains from the memory the set of pre-calibrated CCTs. At block 510, the digital processing circuitry selects the pair 608, 610 of pre-calibrated CCTs that neighbour on either side of the determined CCT 606 for the image. At block 512, the digital processing circuitry obtains from the memory the CSTs 612 and weight curves 614 for the pair of CCTs. At block 514, the digital processing circuitry then generates a CST 616 using the weighting function 618. An example weighting function is shown in FIG. 6B and FIG. 6C using the blending weights g and 1−g for the selected pair obtained from the memory, and corresponds to equation (8). The final CST, $T_f$, is computed using equation (7). At block 516, the image is produced in perceptual color space by applying the CST to the sensor-specific color space image.

Referring now to FIG. 7, an embodiment of the second method is shown. The second method provides a full color correction by applying a fixed CST matrix generated using a mapping derived from a dataset of one or more training images of incorporating a color rendition chart.

Figure 8:
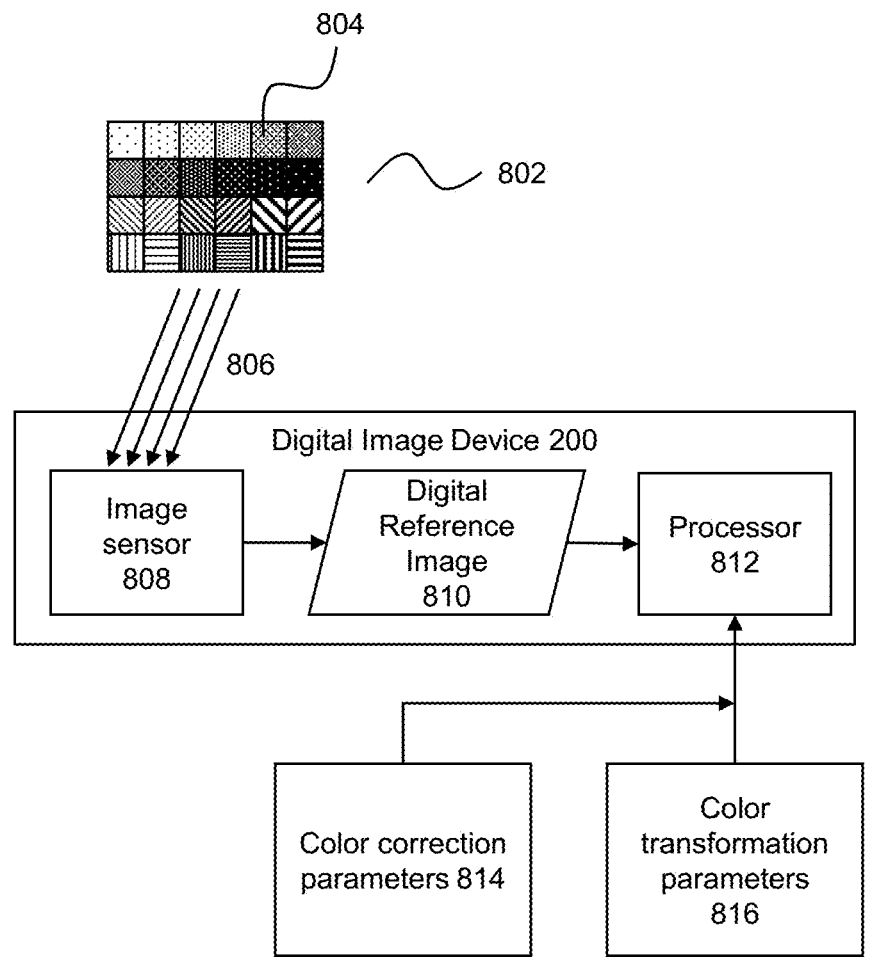
FIG. 8 is a block diagram illustrating a color mapping system.

FIG. 8 in accordance with an exemplary embodiment of the invention illustrates a block diagram 800 of a color mapping system. Color correction parameters 814 and color transformation parameters 816 are determined by evaluating a digital reference image 810 produced by the image sensor 808 when the image sensor 808 receives light signals 806 from a known reference source 802. The reference source 802 may be any reflective or active light source that emits predictable light signals 806 under controlled conditions such as, for example, a known color rendition chart including one or more colored patches 804 having a known reflectance under one or more known illuminants. The reference source 802 is a Macbeth Color rendition chart in the exemplary embodiment. Other reference sources 802 may be used in some situations. The image sensor 808 produces a digital reference image 810 when the reference source 802 is illuminated with an arbitrary illumination and the reflected light signals 806 are captured by the image sensor 808.

The processor 812 processes and evaluates the digital reference image 810 to determine the color correction parameters 814 and the color transformation parameters 816. The processor 812 computes an optimum value of full 3×3 full color-balance and correction linear transform matrix to remove the effect of illumination. The processor 812 also computes an optimum value of a fixed color-space transformation matrix that results in an optimum conversion from the digital reference image 810 in a color corrected sensor-specific color space such as raw RGB to a standardized perceptual color space such as ProPhoto RGB. Thus, in this method, rather than computing a CST for a specific illumination, a single fixed CST, $T_{fixed}$, is computed to apply to an arbitrary illumination, as follows:

$$T_{fixed} = \arg\min_T \| \Sigma_i (C_{xyz}R - TW_F^{I_i}\Phi_{cam}^{I_i}) \|^2, \quad (9)$$

where the index I selects an image in the dataset, $I_i$ represents the illumination for that image's scene, and R is assumed to be calibration chart patches' spectral responses. As can be seen, the single fixed CST is designed to minimize error between the target perceptual color space and a color balanced transformation of the image in the sensor-specific color space over all images. This can be accomplished in an iterative approach wherein the processor obtains reference images one at a time from the memory and computes the error value for each such image when applying a particular CST, and using the minimum error as the fixed CST.

Two embodiments are provided for computing $T_{fixed}$. In the first embodiment, only a single observation of the color chart is used. In this embodiment, equation (9) can be simplified such that i indexes to only a single observation of the color chart with a single illumination. In the example shown in FIG. 7, the image used has a CCT of 6500° K. In the second embodiment, a plurality (up to all) of the observations of the color chart for each different illumination are used. In the example shown in FIG. 7, three images with CCTs of 2500° K, 6500° K and 4000° K are used. It will be appreciated that the dataset may comprise many more than three images.

In an aspect, the fixed CST, $T_{fixed}$, can be applied to a sensor-specific color space image derived using a machine learning approach. One such approach, which is illustrated in FIG. 7, comprises training a Bayesian classifier to estimate the full color balance matrix, $W_F^I$, for a given camera image $\Phi_{cam}^I$ under an arbitrary illumination I. An example of such an approach is provided in D. Cheng, B. Price, S. Cohen, and M. S. Brown. Beyond white: ground truth colors for color constancy correction. In ICCV, 2015, the contents of which are incorporated herein by reference.

In a third embodiment, the digital processing circuitry applies the same interpolation strategy from the first embodiment to the full color balance and CST estimated using equation (9).

Figure 10:
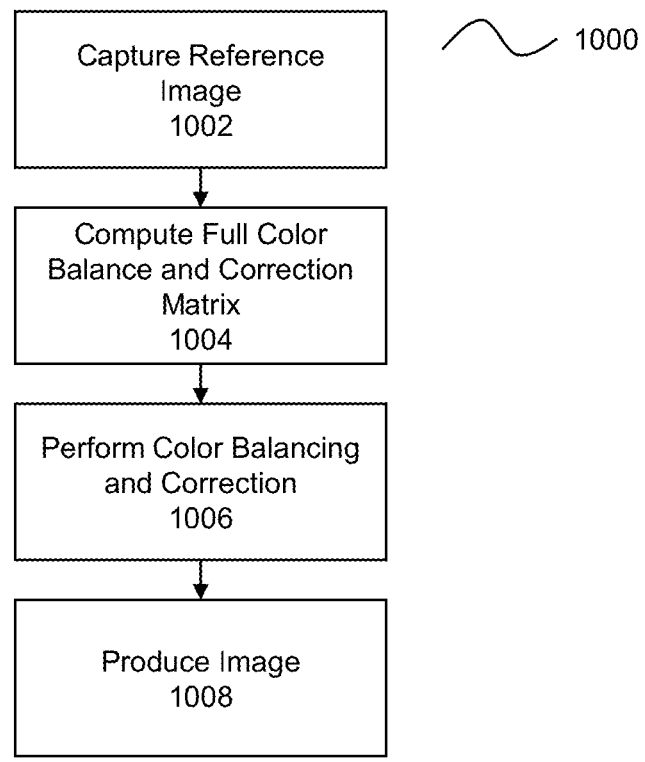
FIG. 10 is a flowchart illustrating a method of generating image correction parameters.

Referring now to FIG. 10, a more specific example for using the dataset for determining image correction parameters in accordance with an embodiment is illustrated as flowchart 1000. At block 1002, a digital reference image is captured for at least one illumination. The image sensor produces a digital reference image when the image sensor is exposed to the reference source, which in this case is a color rendition chart placed among a scene. The digital data corresponding to the digital reference image is stored in memory of the processor. In the exemplary embodiment, the color rendition chart is arbitrarily illuminated. The response of image sensor to an arbitrary illumination can be modeled as follows:

$$\Phi_{cam}^I = C_{cam}\,\mathrm{diag}(I)R = C_{cam}LR, \quad (1)$$

At block 1004, the full color-balance and correction matrix is determined and is applied to the digital reference image to produce a color corrected image at block 1006. The full color-balance and correction matrix is defined as follows:

$$W_F = \arg\min_{W_F} \| C_{cam}R - W_F\Phi_{cam}^I \|^2, \quad (3)$$

where $W_F$ is a full color balance and correction matrix that minimizes the error between colors represented by the colorimetric values and the color corrected pixel values. Here the subscript F is used to denote that this matrix is a full 3×3 matrix of all the observed scene materials.

In the exemplary embodiment, the processor executes an iterative process to perform an equation minimization technique to minimize the error. A color difference error for any arbitrary illumination between the colorimetric values of the color patches and its color corrected pixel values is then given as:

$$Err_{W_F^{I_i}} = \| C_{cam}R - W_F^{I_i}\Phi_{cam}^{I_i} \|^2 \quad (5)$$

-continued $$Err_{W_D^{I_i}} = \|C_{cam}R - W_D^{I_i}\Phi_{cam}^{I_i}\|^2,$$

where the index i is used to denote the different illuminations $I_1$ or $I_2$. In this figure, the $W_F^{I_i}$ and $W_F^{I_i}$ are computed for the respective illuminations $I_i$.

The color difference error is calculated for all the color patches contained in the color rendition chart. The color difference error for each color patch is used to calculate the total color difference error. The final full color-balance and correction matrix is determined so as to attain the minimum total color difference error. A plurality of full color-balance and correction matrix candidates can be prepared, the total color difference error can be calculated for each candidate full color-balance correction matrix, and the candidate full color-balance correction matrix resulting in the lowest total color difference error can be used. The full color-balance and correction matrix can also be modified, and the total color difference error can be further calculated. This series of processes can be repeated so that the full color-balance and correction matrix resulting in the minimum total color difference error can be calculated by successive approximations.

Once the optimum full color-balance and correction matrix is computed, the processor performs the required adjustment to remove the effect of illumination and produces a corrected image 1008 and stores it in memory.

Figure 11:
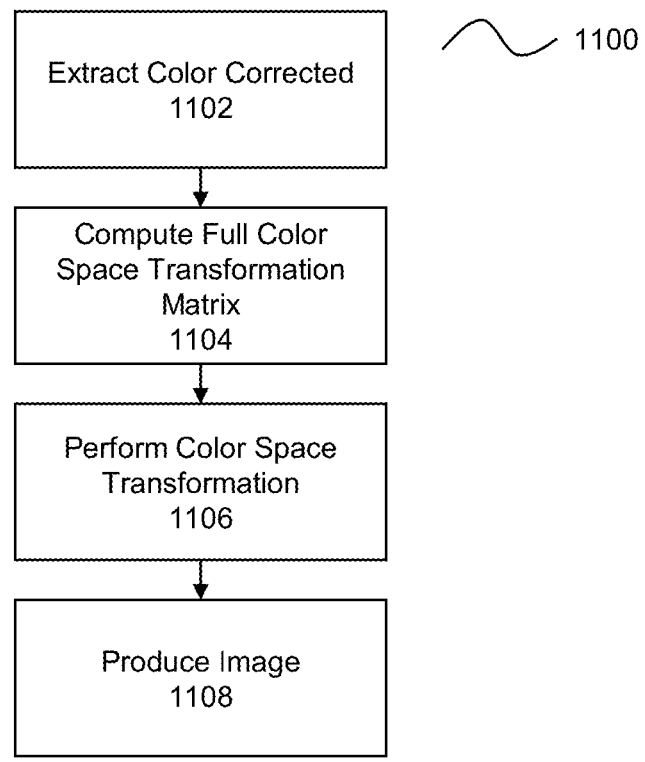
FIG. 11 is a flowchart illustrating a method of generating color transformation parameters.

FIG. 11 is a flow chart 1100 of a procedure of determining the color transformation parameters in accordance with an exemplary embodiment of the invention. At block 1102, the processor extracts color corrected image from memory to transform the image from sensor-specific color space to perceptual color space.

At block 1104, the fixed color-space transformation matrix is determined and is applied to color corrected image to transform the image from sensor-specific color space to perceptual color space. At block 1106, once the optimum fixed color-space transformation matrix is computed, the processor, for any arbitrary illumination, performs the required transformation to map the sensor-specific color space to perceptual color space, produces a digital image 1108 and stores it in memory.

Figure 12:
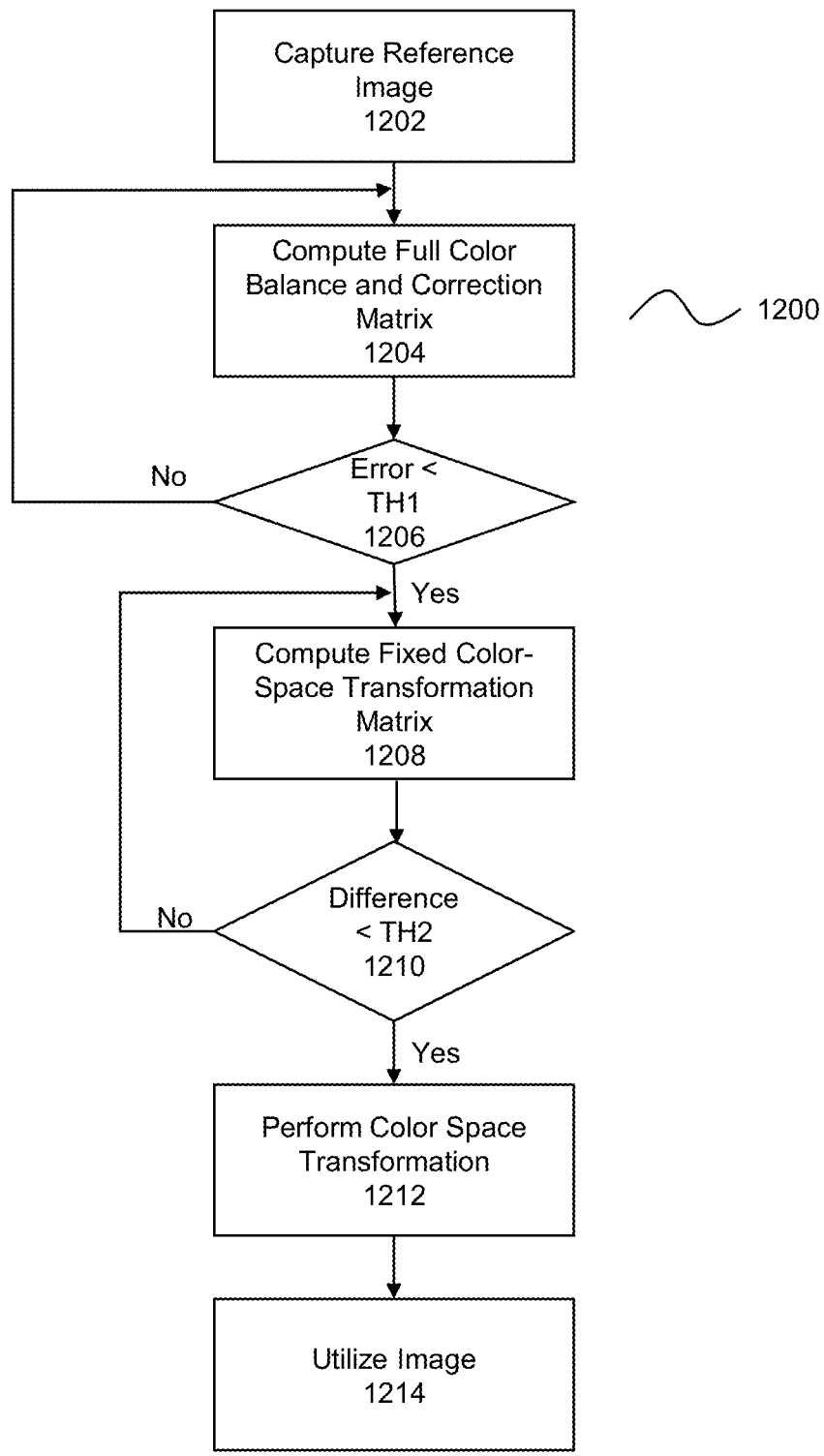
FIG. 12 is a flowchart illustrating a method for generating a perceptual color space image.

FIG. 12 illustrates a method 1200 for generating a perceptual color space image in accordance with the present embodiment. At block 1202, the image sensor produces a raw digital image representing the image in sensor-specific color space.

At block 1204, a processor estimates and applies an optimum full color-balance and correction matrix to the raw digital image to remove the effect of illumination and generates an error signal based on difference between the colors represented by the colorimetric values and the colors represented by the color corrected pixel values.

At block 1206, the error signal generated is compared to a predefined first threshold. If this error signal is smaller than the first threshold, the color corrected image is processed for color space transformation. Otherwise, the optimum value of the full color-balance and correction matrix is again computed and the process is repeated again.

At block 1208, a processor estimates and applies an optimum fixed color-space transformation matrix to the color corrected image to transform the sensor-specific color space to perceptual color space and generates a difference signal based on difference between the target perceptual color space representations and converted imaging device captured image representations in a perceptual color space.

At block 1210, the difference signal is compared to a predefined second threshold. If this difference signal is smaller than the second threshold, the transformed image is generated by applying the color space transformation at block 1212 and ready at block 1214 for display or is stored in memory for future use. Otherwise, the optimum value of fixed color-space transformation matrix is again computed and the process is repeated again.

Figure 9:
FIG. 9 is an example of images from a representative dataset for generating color image correction parameters and color transformation parameters.

Referring now to FIG. 9, an example of some of the images from a representative dataset for generating the color image correction parameters and color transformation parameters is shown. An exemplary dataset consists of four DSLR cameras (Canon 1D, Nikon D40, Sony a57, and Olympus E-PL6) and three mobile phone cameras (Apple iPhone 7, Google Pixel, and LG-G4). For each camera 100 colorimetrically calibrated images are generated. For the DSLR cameras, images may be selected from the NUS dataset for calibration. The NUS dataset was created for research targeting color constancy and provides only ground truth for the illumination. This dataset has over 200 images per camera, where each camera is imaging the same scene. It may be suitable to select a subset of this dataset, considering images in which the color chart is sufficiently close to the camera and fronto-parallel with the respect to the image plane. For the mobile phone cameras, images may be captured taking scenes outdoors and in an indoor laboratory setting with multiple illumination sources. All scenes contain a color rendition chart. Like the NUS dataset, the mobile phone dataset also uses carefully positioned cameras such that they are imaging the same scene.

Colorimetric calibration for each image in the dataset is performed using the X-Rite camera calibration software that produces an image-specific color profile for each image. The X-Rite software computes a scene-specific white-balance correction and CST for the input scene. This is equivalent to estimating $W_D$ and $T_I$ based on CIE XYZ values of the X-Rite chart.

Digital image techniques may be used to obtain the colorimetrically calibrated image values. For example, the software platform described in H. C. Karaimer and M. S. Brown, A software platform for manipulating the camera imaging pipeline, in *ECCV,* 2016, which is incorporated herein by reference, with the X-Rite calibrated color profiles may be used. The camera pipeline is stopped after the colorimetric calibration stage. This enables obtaining the image at the colorimetric conversion stage without photo-finishing applied.

Preferably, for the ground truth images, the camera pipeline is stopped after the values are transformed to linear-ProPhoto RGB color space. Thus, the 700-image dataset provides images in their unprocessed raw-RGB color space and their corresponding colorimetric calibrated color space in ProPhoto RGB. Note that while CIE XYZ has been discussed herein as the target perceptual color space, most cameras instead use the Reference Output Medium Metric (ROMM) color space, also known as ProPhoto RGB. ProPhoto RGB is a wide-gamut color space that is related to CIE 1931 XYZ by a linear transform.

One potential technical benefit to improved colorimetric conversion is that cameras of different makes and models will capture scene colors in a more consistent manner.

Although the invention has been described with reference to certain specific embodiments, various transformations thereof will be apparent to those skilled in the art. The scope of the claims should not be limited by the preferred embodiments, but should be given the broadest interpretation consistent with the description as a whole.

The invention claimed is:

1. A computer-implemented method for colorimetric mapping, the method comprising:
   obtaining a digital reference image, comprising:
      illuminating a known reference source with any arbitrary illumination that can be unknown; and
      determining an observed illumination by receiving light signals from the reference source at an image sensor;
   determining a color-balance matrix by minimizing an error between colorimetric values of the digital reference image and color corrected pixel values;
   applying the color-balance matrix to the digital reference image to produce a color-corrected image;
   determining a color-space linear transformation matrix that transforms a color space of the image sensor to a perceptual color space, the color-space transformation matrix comprises a diagonal matrix of the sensitivity of the image sensor and the observed illumination;
   generating a transformed image by applying the color-space transformation matrix to the color corrected image; and
   outputting the transformed image.

2. The method of claim 1, further comprising comparing the error between the colors represented by colorimetric values of the digital reference image and the color corrected pixel values to an error threshold, and where the error is above the error threshold, repeating determining the color-balance matrix.

3. The method of claim 2, further comprising using the color-space transformation matrix to generate a difference signal between a target perceptual color space representation and the color corrected image in the perceptual color space, and comparing the difference signal to a difference threshold, and where the difference signal is above the difference threshold, repeating determining the color-space transformation matrix.

4. The method of claim 3, wherein the difference signal is determined based on color patches in the known reference source.

5. The method of claim 4, wherein the known reference source is a Macbeth Color rendition chart.

6. The method of claim 1, wherein the sensitivity of the image sensor a is a matrix with rows representing Red, Green, and Blue channels and the rows representing a number of spectral samples in a visible range.

7. The method of claim 1, wherein determining the color-balance matrix comprises using a trained Bayesian classifier, the Bayesian classifier trained using one or more training samples of color-space transformation matrices for given digital reference images under arbitrary illuminations.

8. The method of claim 7, wherein the colorimetric values of the digital reference image comprises spectral responses of calibration chart patches and a diagonal matrix of the sensitivity of the image sensor, and the color corrected pixel values comprise a response of the image sensor to the arbitrary illumination.

9. A system for colorimetric mapping, the system comprising one or more processors and a data storage, the one or more processors configured to instruct image processing circuitry to:
   obtain a digital reference image, comprising:
      illuminating a known reference source with any arbitrary illumination that is not known or calibrated for in advance; and
      determining an observed illumination by receiving light signals from the reference source at an image sensor;
   determine a color-balance matrix by minimizing an error between colorimetric values of the digital reference image and color corrected pixel values;
   apply the color-balance matrix to the digital reference image to produce a color-corrected image;
   determine a color-space linear transformation matrix that transforms a color space of the image sensor to a perceptual color space, the color-space transformation matrix comprises a diagonal matrix of the sensitivity of the image sensor and the observed illumination;
   generate a transformed image by applying the color-space transformation matrix to the color corrected image; and
   output the transformed image.

10. The system of claim 9, the image processing circuitry further compares the error between the colors represented by colorimetric values of the digital reference image and the color corrected pixel values to an error threshold, and where the error is above the error threshold, repeats determining the color-balance matrix.

11. The system of claim 10, the image processing circuitry further uses the color-space transformation matrix to generate a difference signal between a target perceptual color space representation and the color corrected image in the perceptual color space, and compares the difference signal to a difference threshold, and where the difference signal is above the difference threshold, repeating determining the color-space transformation matrix.

12. The system of claim 11, wherein the difference signal is determined based on color patches in the known reference source.

13. The system of claim 12, wherein the known reference source is a Macbeth Color rendition chart.

14. The system of claim 9, wherein the sensitivity of the image sensor a is a matrix with rows representing Red, Green, and Blue channels and the rows representing a number of spectral samples in a visible range.

15. The system of claim 9, wherein determining the color-balance matrix comprises using a trained Bayesian classifier, the Bayesian classifier trained using one or more training samples of color-space transformation matrices for given digital reference images under arbitrary illuminations.

16. The system of claim 15, wherein the colorimetric values of the digital reference image comprises spectral responses of calibration chart patches and a diagonal matrix of the sensitivity of the image sensor, and the color corrected pixel values comprise a response of the image sensor to the arbitrary illumination.

17. A computer-implemented method for colorimetric mapping, the method comprising:
   obtaining a captured image from an image sensor;
   estimating scene illumination of the captured image;
   determining a correlated color temperature (CCT) for the estimated scene illumination;
   selecting two pre-calibrated CCTs that neighbour either side of the determined CCT;
   generating a color space transform (CST) using a weighting function, the weighting function comprising an interpolation of the two pre-calibrated CCTs;
   applying the CST to the captured image to generate a transformed image in perceptual color space; and
   outputting the transformed image.

18. The method of claim 17, wherein the weighting function comprises a first CST of a first of the two pre-calibrated CCTs multiplied by a blending weight added to a second CST of a second of the two pre-calibrated CCTs multiplied by one minus the blending weight.

* * * * *